(12) United States Patent
Smith

(10) Patent No.: US 7,137,139 B1
(45) Date of Patent: Nov. 14, 2006

(54) METHOD, SYSTEM, AND APPARATUS FOR PROVIDING READ-ONLY ACCESS TO NETWORK ELEMENT CONFIGURATION DATA

(75) Inventor: Jeffery Alan Smith, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 867 days.

(21) Appl. No.: 10/007,193

(22) Filed: Dec. 4, 2001

(51) Int. Cl.
*G06F 21/00* (2006.01)

(52) U.S. Cl. .......................... 726/3; 713/152; 713/170

(58) Field of Classification Search ............... 713/200, 713/201, 188, 194, 2, 1, 152, 170; 710/3; 711/101–104; 709/222; 380/200, 201, 255, 380/277; 726/2, 3
See application file for complete search history.

(56) References Cited

U.S. PATENT DOCUMENTS 5,870,558 A * 2/1999 Branton et al. ............. 709/224
6,295,540 B1 * 9/2001 Sanschagrin et al. ....... 707/201

\* cited by examiner

*Primary Examiner*—Kim Vu
*Assistant Examiner*—Joseph Pan
(74) *Attorney, Agent, or Firm*—Merchant & Gould

(57) ABSTRACT

A method for providing read-only access to network element configuration data is provided. A request is received to access configuration data for a network element. In response to such a request, a communications session is initiated with the network element. Configuration data is then received from the network element. The configuration data is compared to configuration data for the network element previously stored in a database. If the previously-stored configuration is not identical to the received configuration data, the database is updated with the current configuration data for the network element. The configuration data is then transmitted in read-only format as a response to the initial request for network element configuration data.

20 Claims, 6 Drawing Sheets

METHOD, SYSTEM, AND APPARATUS FOR PROVIDING READ-ONLY ACCESS TO NETWORK ELEMENT CONFIGURATION DATA

TECHNICAL FIELD

The present invention generally relates to the field of network data communications. More specifically, the present invention relates to a method, system, and apparatus for providing access to configuration data for network elements.

BACKGROUND OF THE INVENTION

Recent advances and improvements in communications technology provide the communications industry with an enormous number of opportunities to improve existing services and to branch into new service areas. For instance, thousands of miles of fiber optic cable have been deployed in optical networks. These optical networks make possible the transmission of large amounts of information at great speeds and are used to carry voice signals, data, and video.

The management and monitoring of a large optical network, or other types of large networks, can be difficult and expensive. One factor contributing to the cost of maintaining and operating large optical networks is the lack of reliable data regarding installed network equipment. In many networks, databases storing information regarding the type of installed equipment and the configuration of the devices are maintained manually. In many cases, manually maintaining this type of data causes it to be unreliable. Therefore, in many situations, a service technician must be dispatched to the physical location of a network device to verify the existence of the device and its configuration before any changes may be made to the network. Sending a technician to the physical location of the equipment in this manner is time consuming and expensive.

While methods and systems do exist that allow technicians to remotely determine the existence and configuration of a network device, these systems also allow a user to make changes to the configuration of the network device. For instance, the transaction one ("TL1") protocol allows users to remotely gain access to network elements and to execute commands on the network elements. Through the use of TL1, the existence and configuration of devices on an optical network may be determined. However, providing access to network elements to a user through the use of the TL1 language provides the user with the ability to make changes to the configuration of the network elements. Allowing a user to make changes to the network equipment in this manner opens a network up to the possibility of inadvertent or malicious modification of the configuration of network elements. In many situations, a malicious user with access to the configuration of network elements through the TL1 protocol could render an entire network useless by issuing only a few commands.

Therefore, in light of the above, there is a need for a method and system for providing access to network element configuration data that will provide easy access to accurate information regarding the installation and configuration of network data equipment without requiring a technician to physically visit the location of the equipment. Moreover, there is a need for a method and system for providing access to network element configuration data that can provide data regarding the existence and configuration of network elements without also allowing users to execute commands or modify the configuration of the equipment.

SUMMARY OF THE INVENTION

The present invention meets the above-described needs by providing a method, system, and apparatus for providing read-only access to network element configuration data. According to one actual embodiment of the present invention, an Intranet World Wide Web ("WWW" or "Web") site is provided through which technicians or other users may retrieve read-only information regarding the existence or configuration of elements on an optical or other type of network.

According to another actual embodiment of the invention, a method for providing read-only access to network element configuration data is provided. According to this method, a request is received to access the configuration data for a network element. In response to the request, a communications session is initiated with the identified network element. The requested configuration data is then received from the network element and transmitted in response to the request in a read-only format. A target identification code ("TID") may be utilized to identify the network element for which the configuration data should be received.

According to another actual embodiment of the present invention, configuration data regarding the network element is stored in a database. When a request is received to access the configuration data for the network element, the previously-stored configuration data is retrieved. The previously-stored configuration data is compared to the configuration data received from the network element. A determination is made as to whether the previously-stored configuration data and the configuration data received from the network element itself are identical. If the previously-stored configuration data and the configuration data received from the network element are not identical, the configuration data received from the network element is stored in the network database. In this manner, a database containing valid configuration data for each network element on a network may be created and maintained.

According to yet another embodiment of the present invention, a system is provided for providing read-only access to network element configuration data. According to this embodiment of the invention, the system comprises a network element located on an optical network. The network element is operative to store configuration data describing the current configuration state of the network element. The network element is also operative to provide the configuration data in response to requests for the data.

The system provided herein also includes a server computer communicatively coupled to the network element. The server computer is operative to provide a Web site at which a request may be received to review the configuration data from the network element. The server computer is also operative to retrieve the configuration data associated with the network element in response to a request for such data and to provide that data in a read-only format.

The server computer may also be operative to store a database containing previously-stored configuration data for the network element. When a request is received at the server computer for configuration data for the network element, the server computer retrieves the configuration data from the network element. The server computer also compares the previously-stored configuration data from the database to the configuration data received from the network element. The server computer determines whether the previously-stored configuration data and the configuration data received from the network element are identical. If the configuration data retrieved from the network element and the previously-stored configuration data are not identical, the server computer is operative to store the configuration data received from the network element in the database.

The present invention also provides a computer-controlled apparatus and a computer-readable medium for providing read-only access to network element configuration data. Additional aspects of the present invention will be apparent from the detailed description that follows.

DETAILED DESCRIPTION OF AN ILLUSTRATIVE EMBODIMENT

As described briefly above, the present invention provides a method, system, apparatus, and computer-readable medium for providing read-only access to configuration data for network elements. One embodiment of the present invention operates to provide configuration data for network elements operating within a synchronous optical network ("SONET"). As known to those skilled in the art, SONET is a standardized method for signal conversion between electrical and optical systems. SONET handles a wide range of communications speeds and may be either switched or non-switched.

Figure 1:
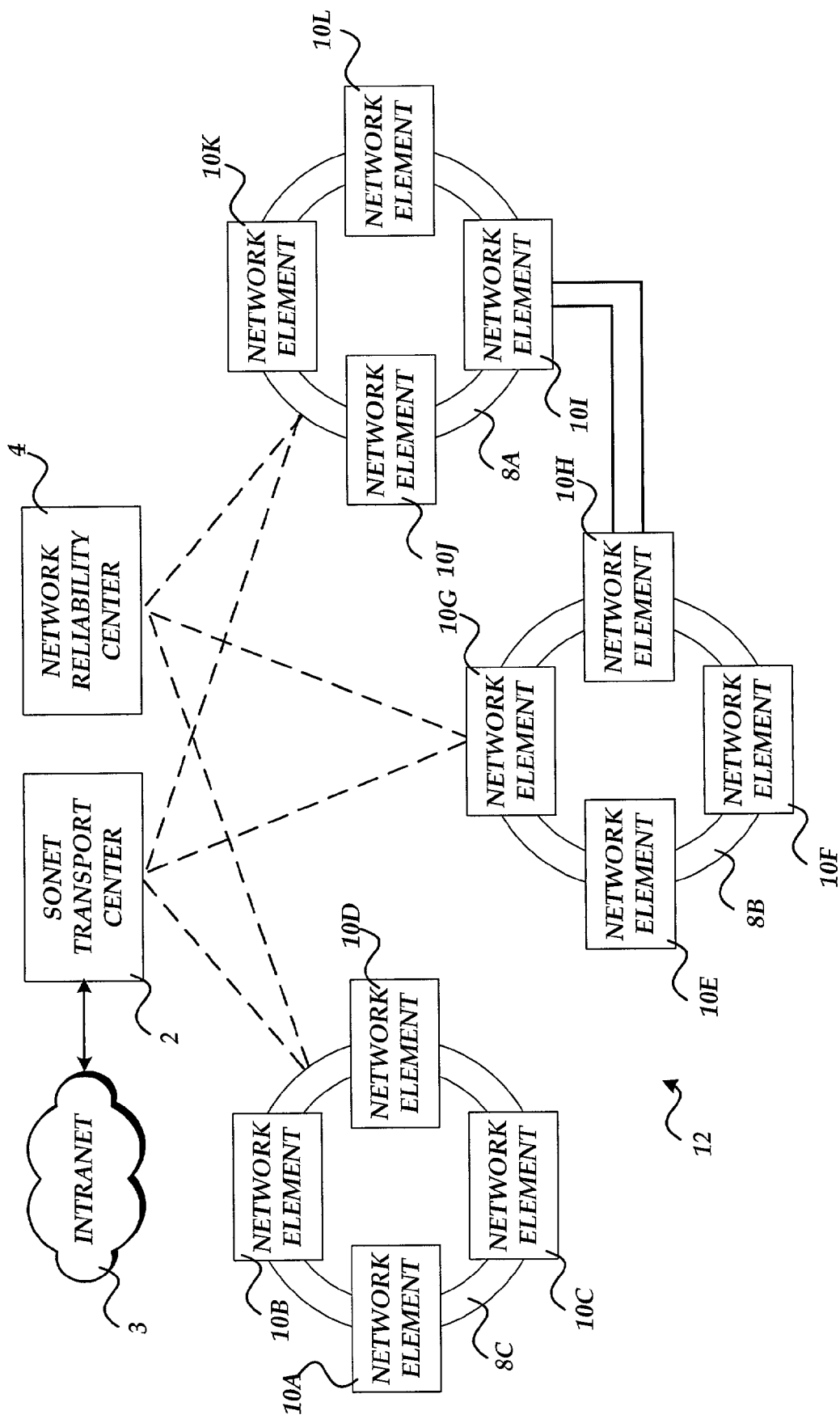
FIG. 1 is a block diagram showing a network that is an illustrative operating environment for aspects of the present invention.

Turning now to FIG. 1, an illustrative operating environment for the present invention will be described. The operating environment shown in FIG. 1 includes an optical network 12 having one or more SONET rings 8A–8C. An optical network is broadly defined as an information transport facility with fiber optic cables ("optical fibers" or "fibers") serving as the physical link or medium for information transport. Generally, an optical network is a synchronous digital network that conforms to certain standards that define a set of optical interfaces (STS-Nc signals) for network transport. SONET defines standard optical signals (STS-Nc signals), a synchronous frame structure for multiplexed digital information traffic, and operation procedures so that optical networks from different manufacturers/carriers may be interconnected.

As shown in FIG. 1, each SONET ring includes network elements 10A–10L (also called SONET hubs or nodes) that are linked by fiber optic connections to form a closed loop or a ring. For instance, the SONET ring 8A includes linked network elements 10I, 10J, 10K, and 10L. The network elements 10A–10L may also be used to couple SONET rings to one another. For instance, network element 10I and network element 10H are utilized to couple SONET ring 8A to SONET ring 8B. It should be appreciated by those skilled in the art that SONET networks may also be built in a linear fashion or using a combination ring-linear architecture. It should also be appreciated that while the present invention operates to provide access to configuration data for network elements within a SONET network, data may be similarly provided for other types of networks.

The network elements comprise network equipment necessary to the operation of the network, such as an add/drop multiplexor or a digital cross-connect system. Each of the network elements 10A–10L in the optical network 12 is communicatively coupled to a SONET transport center 2 and an NRC 4. The NRC 4 provides a single point of contact and accountability for control and analysis of network element alarms or trouble indicators within the optical network 12. The NRC 4 proactively monitors and responds to trouble conditions anywhere in the optical network 12, including all switches and facilities.

The SONET transport center 2 is a computing facility that is coupled to each of the network elements 10A–10L in the optical network 12. The SONET transport center 2 provides a Web site at which read-only access may be had via the Intranet 3 to configuration data of the network elements 10A–10L. Note that this functionality may also be provided at the NRC 4 or other network location. In order to provide such functionality, computer systems are provided at the SONET transport center 2 for providing a Web site or other type of visual interface to configuration data. A computer for providing such a Web site will be described below with respect to FIG. 2. Computer systems utilized at the SONET transport center 2 also utilize a communications protocol to communicate with the network elements 10A–10L. The communications protocol is utilized to request configuration data from the network elements 10A–10L.

In the actual embodiment of the present invention described herein, the protocol utilized for communication between the SONET transport center 2 and the network elements 10A–10L is transaction language one ("TL1"). As known to those skilled in the art, TL1 is a network element management language defined by Telcordia (formerly Bellcore) that is used in telecommunications equipment. TL1 is a cross-vendor, cross-technology machine—machine language and is the primary protocol used in managing SONET networks. TL1 includes standard messages for fault, configuration, performance, security, and testing. While TL1 is utilized to provide a management interface between the SONET transport center 2 and the network elements 10A–10L in the actual embodiment described herein, other types of management protocols may also be utilized.

Figure 2:
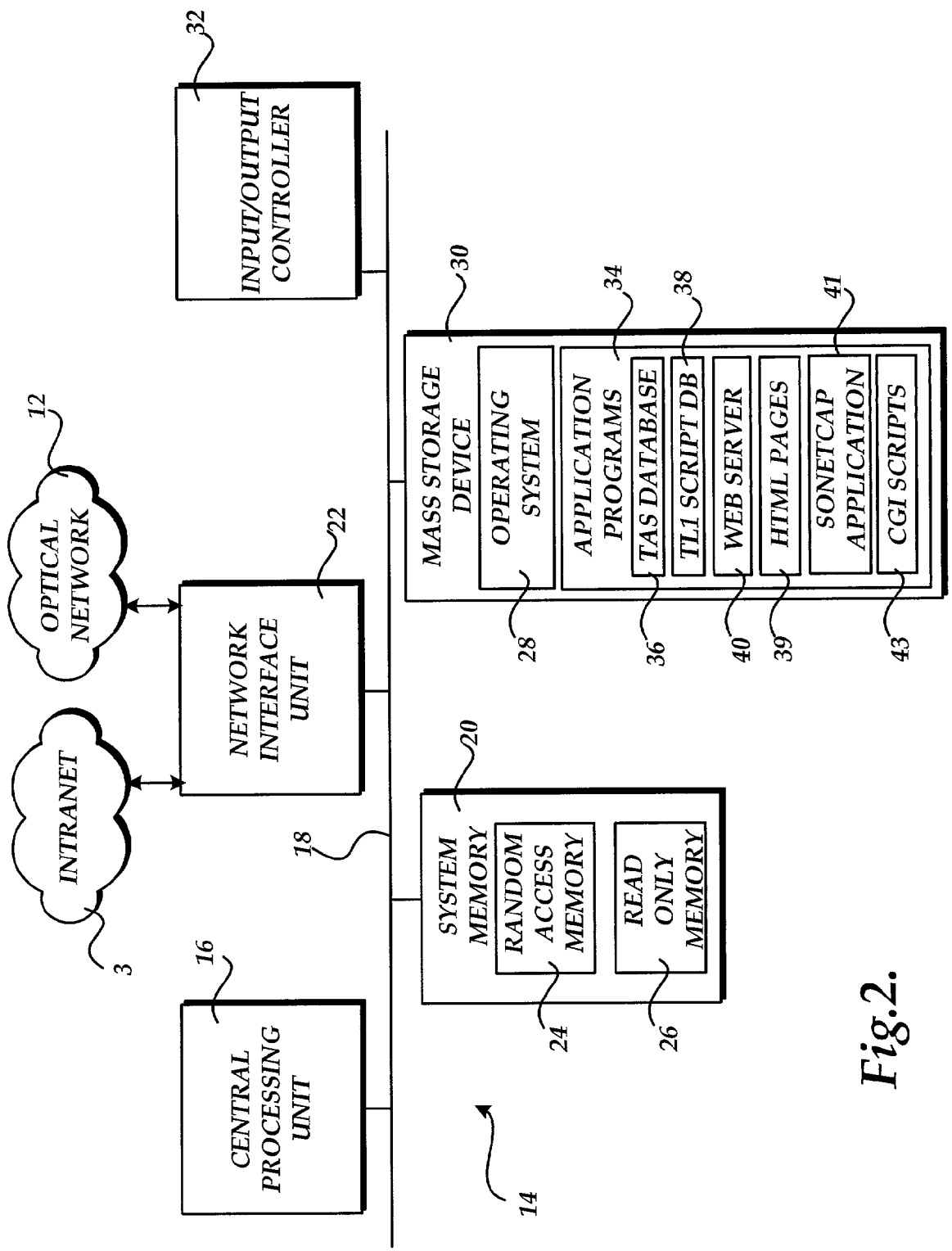
FIG. 2 is a block diagram illustrating a computer architecture for a Web server computer utilized at a SONET transport center for providing read-only access to configuration data for network equipment in an illustrative embodiment of the present invention.
Figure 3:
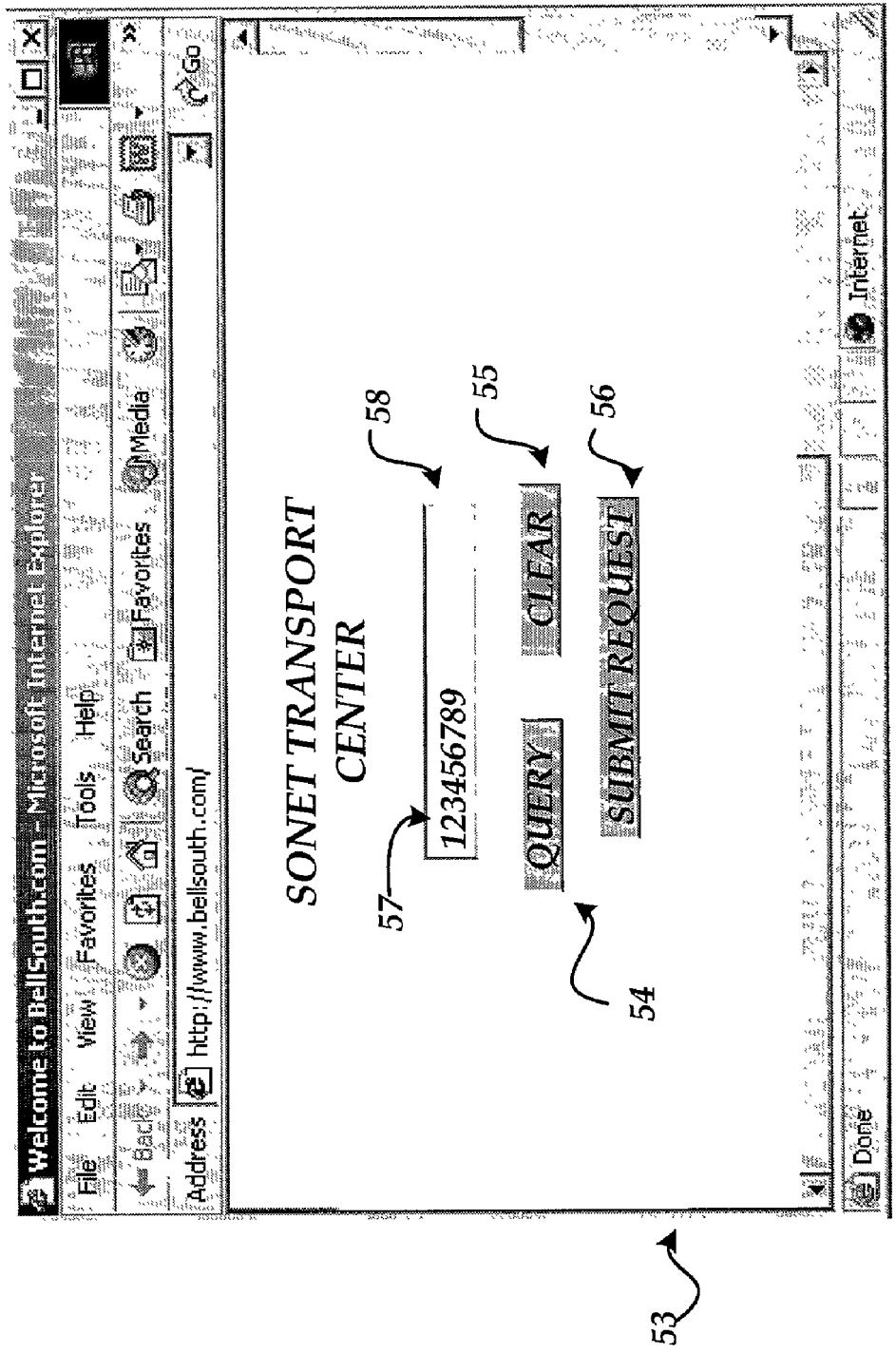
FIG. 3 is a screen diagram showing a portion of an illustrative Web site provided according to one aspect of the present invention.

Turning now to FIG. 2, an illustrative computer architecture for a Web server computer system 14 will be described. The Web server computer 14 is located at the SONET transport center 2 and is utilized primarily to provide an Intranet 3 Web site at which configuration data may be retrieved in a read-only format for the network elements 10A–10L. The computer architecture shown in FIG. 3 illustrates a conventional network-capable Web server computer system, including a central processing unit 16 ("CPU"), a system memory 20, including a random access memory 24 ("RAM") and a read-only memory ("ROM") 26, and a system bus 18 that couples the memory to the CPU 16. A basic input/output system ("BIOS") containing the basic routines that help to transfer information between elements within the computer, such as during startup, is stored in the ROM 26. The Web server computer system 14 further includes a mass storage device 30 for storing an operating system 28 and application programs 34.

The mass storage device 30 is connected to the CPU 16 through a mass storage controller (not shown) connected to the bus 18. The mass storage device 30 and its associated computer-readable media provide non-volatile storage for the Web server computer system 14. Although the description of computer-readable media contained herein refers to a mass storage device, such as a hard disk or CD-ROM drive, it should be appreciated by those skilled in the art that computer-readable media can be any available media that can be accessed by the Web server computer system 14.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

As described briefly above, the Web server computer system 14 is capable of communicating with the network elements 10A–10L to receive configuration data. The Web server computer system 10 connects to the network elements 10A–10L or other devices on the optical network 12 through a network interface unit 22 connected to the bus 18. The Web server computer system 14 may also include an input/output controller 32 for receiving and processing input from a number of devices, including a keyboard or mouse. Similarly, the input/output controller 32 may provide output to a display screen, a printer, or other type of output device.

A number of program modules may be stored in the mass storage device 30 and RAM 24 of the Web server computer system 14, including an operating system 28 suitable for controlling the operation of a networked Web server computer system, such as the UNIX operating system, the SOLARIS operating system from SUN MICROSYSTEMS, or the WINDOWS 2000 operating system from MICROSOFT CORPORATION of Redmond, Wash. The mass storage device 30 and RAM 24 may also store one or more application programs 34. In particular, the mass storage device 30 and RAM 24 may store a SONETCAP application 41, a TL1 script database 38, a telemetry assignment system ("TAS") database 36, a Web server application program 40, Hyper-text markup language ("HTML") pages 39 and common gateway interface scripts 43. The SONETCAP application program 36 contains the actual code for communicating with the network elements 10A–10L for retrieving configuration data from the network elements 10A–10L. The TL1 script database 38 contains customized TL1 scripts corresponding to each type of network element on the optical network 12. Custom scripts are utilized for each type of network element to account for peculiarities in implementations of the TL1 protocol.

The Web server application program 40 comprises a standard server application for receiving and responding to requests for HTML pages and other documents. The Internet Information Server from the MICROSOFT CORPORATION of Redmond, Wash., may be utilized as the Web server application 40. Other types of Web server application programs 40 as known to those skilled in the art may be utilized. The Web server application 40 receives a request for HTML pages 39 in response to these requests. Common Gateway Interface ("CGI") scripts 43 may be utilized to communicate with the SONETCAP application 41 and to generate pages containing configuration data. These Web pages may then be returned to the requesting computer over the Intranet 3.

The TAS database 36 is utilized to store configuration information for network elements. As will be described below, the TAS database 36 is updated each time a request is received for configuration data for a network element. Additional details regarding the operation of the Web server application program 40, the SONETCAP application 41, and the CGI scripts 43 will be described below with reference to FIGS. 3A–6.

Referring now to FIG. 3, a screen diagram showing a portion of an illustrative Web site provided according to an aspect of the present invention will be described. As shown in FIG. 3, a user may browse the Web site provided by the present invention using a standard Web browser application program 53. When a user browses to the Web site provided by the present invention, the user is first requested to provide a valid login and password. If the user provides a login and password that are authorized to access the Web site, the screen display shown in FIG. 3 is provided.

As shown in FIG. 3, a text entry dialog box 58 is provided in which a user may enter a TID for a network element. As known to those skilled in the art, the TID is used to identify the target network element for a TL1 command. Once the user has provided the TID 57, the user may press the clear button 55 to clear the current entry. The user may also select the submit request button 56 to submit the identified TID 57 to the Web server computer 14. In response to the selection of the submit request button 56, the Web server computer 14 queries the network element identified by the TID 57 for its configuration data. When the configuration data has been received, it is displayed to the user on another Web page. The Web page only provides read-only access to the configuration data and provides no functionality for modifying the configuration of the specified network element.

Figure 4:
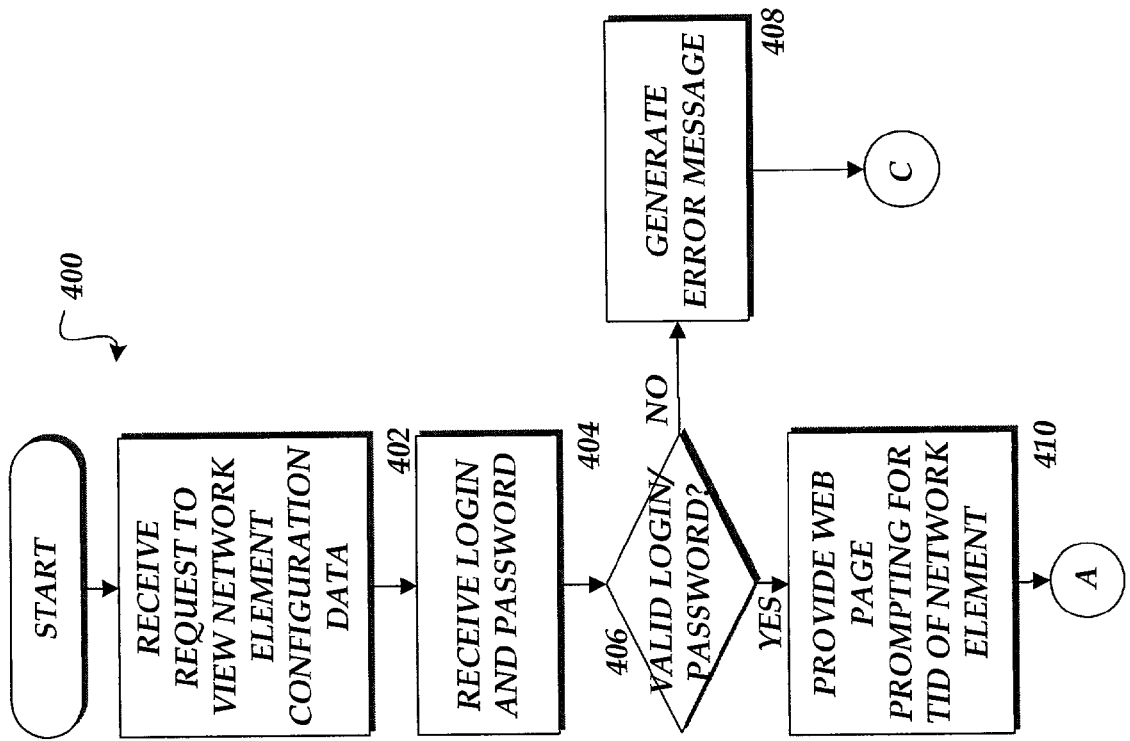
FIGS. 4–6 are flow diagrams illustrating an exemplary routine for providing read-only access to configuration data according to one actual embodiment of the present invention.
Figure 5:
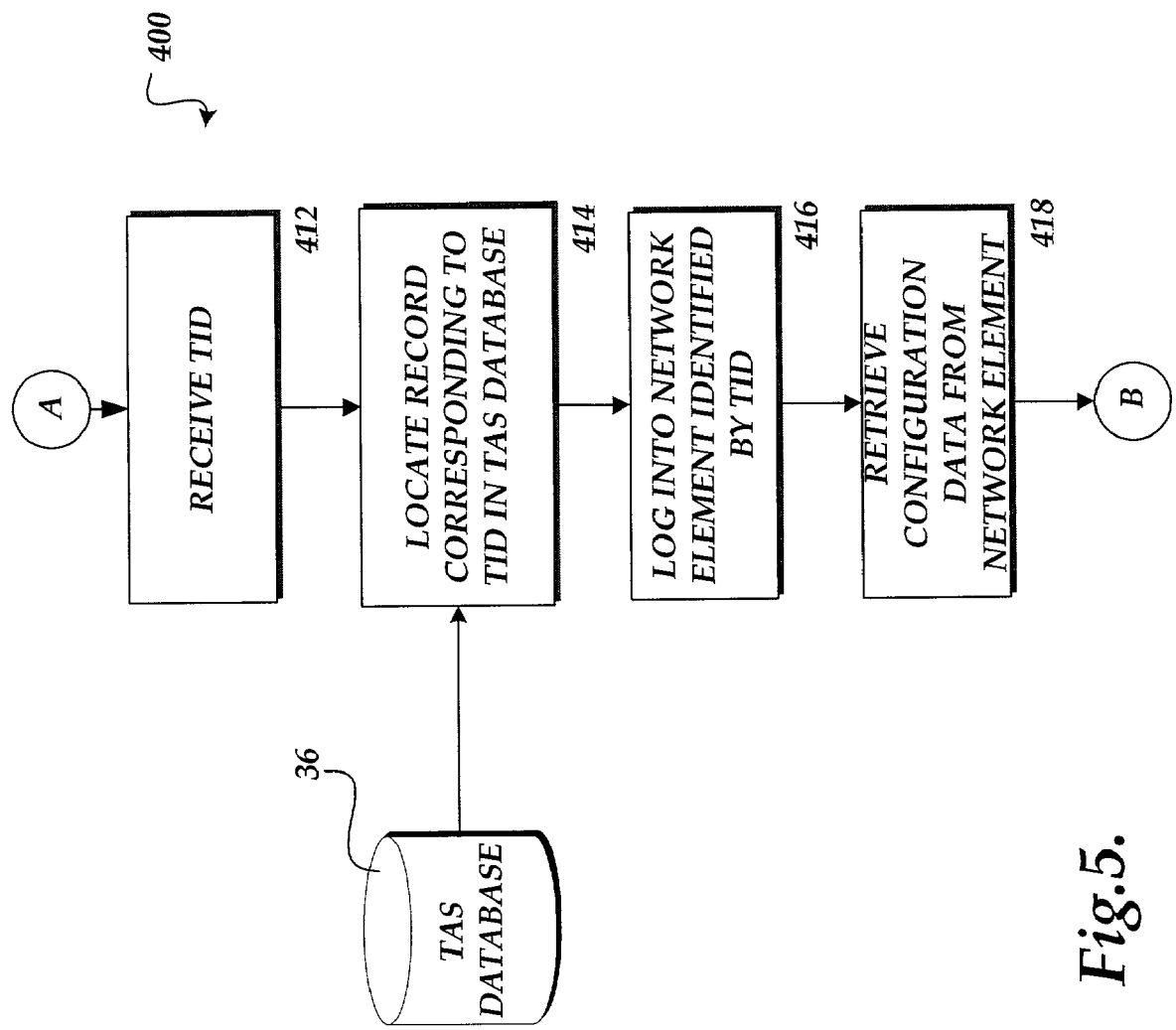
Figure 6:
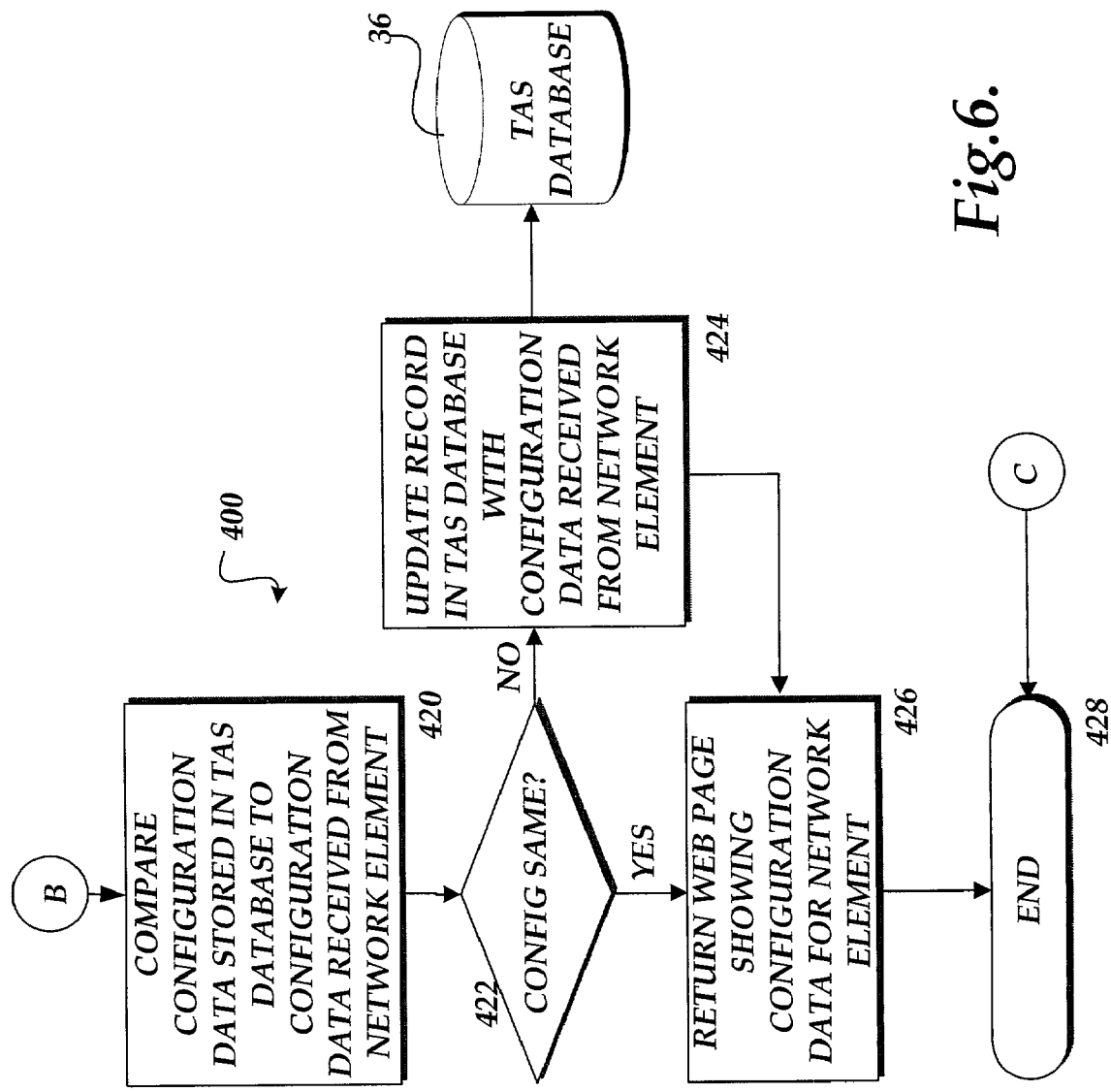

Referring now to FIG. 4, an illustrative routine 400 will be described for providing read-only access to configuration data for a network element. The routine 400 begins at block 402, where a request to view network element configuration data is received. The routine 400 then continues to block 404 where a login and password are also received. The routine 400 continues to block 406 where a determination is made as to whether the received login and password are valid. If the received login and password are not valid, the routine 400 branches to block 408, where an error message is generated. From block 408, the routine 400 branches to block 428, where it ends.

If, at block 406, it is determined that a valid login and password have been received, the routine 400 continues to block 410 where a Web page is provided prompting a user for the TID of a network element for which configuration data should be received. From block 410, the routine 400 continues to block 412, where a TID is received from the user.

From block 412, the routine 400 continues to block 414, where a record is retrieved from the TAS database 36 corresponding to the TID provided by the user. As described above, information is stored in the TAS database 36 corresponding to the identified network element each time an access request is made for the configuration data corresponding to the network element. By checking the contents of the TAS database 36 each time a request for configuration data is received, previously-stored configuration data can be updated with the current configuration data for the network element.

From block 414, the routine 400 continues to block 416 where a communications connection is opened with the network element identified by the TID. At block 418, TL1 commands are issued to the network element requesting the configuration data for the network element. In response to these commands, the network element returns the requested configuration data. The routine 400 then continues to block 420, where a comparison is made between the configuration data previously stored in the TAS database 36 and the configuration data received from the network element.

At block 422, a determination is made as to whether the configuration data stored previously in the TAS database 36 is identical to the configuration data received from the network element. If, at block 422, it is determined that the configuration data stored previously in the TAS database 36 is not identical to the configuration data received from the network element, the routine 400 branches to block 424. At block 424, the database record stored in the TAS database 36 corresponding to the network element identified by the TID is updated with the configuration data received from the network element. The routine 400 then continues from block 424 to block 426.

If, at block 422, it is determined that the configuration data previously stored in the TAS database 36 is identical to the configuration data received from the network element, the routine 400 continues to block 426. At block 426, a Web page is generated showing configuration data for the network element. The routine 400 continues from block 426 to block 428, where it ends.

Based on the foregoing, it should be appreciated that the present invention provides a method, system, apparatus, and computer-readable medium for providing read-only access to network element configuration data. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for providing read-only access to configuration data for a network element configuration data, comprising:

receiving a request to access the configuration data for the network element, the request comprising a target identification code corresponding to the network element; and in response to the request, initiating a communications session through a SONET transport center with the network element, the network element comprising SONET hubs that are linked by fiber optic connections to form a closed loop, receiving the configuration data from the network element, transmitting the configuration data in a read-only format as a response to the request;

maintaining a mass storage device, the mass storage device comprising a SONETCAP application comprising instructions for communicating with the network element and a TL1 script database comprising a customizable script corresponding to the network element to account for peculiarities in implementation of a TL1 protocol, wherein receiving the configuration data comprises using the SONETCAP application to communicate with the network element and using the TL1 script database to implement the TL1 protocol to communicate with the network element;

retrieving previously stored configuration data associated with the network element from a database;

comparing the previously stored configuration data to the configuration data received from the network element;

determining whether the previously stored configuration data and the configuration data received from the network element are identical; and in response to determining that the previously stored configuration data and the configuration data received from the network element are not identical, storing the configuration data received from the network element in the database.

2. The method of claim 1, wherein said request further comprises a user login and password, and wherein an error message is provided in response to said request if said user login and password are not authorized to access said configuration data.

3. The method of claim 1, further comprising:

retrieving previously stored configuration data associated with said network element from a database;

comparing said previously stored configuration data to said configuration data received from said network element;

determining whether said previously stored configuration data and said configuration data received from said network element are identical; and in response to determining that said previously stored configuration data and said configuration data received from said network element are not identical, storing said configuration data received from said network element in said database.

4. The method of claim 3, wherein said request is received at a World Wide Web site.

5. The method of claim 4, wherein said World Wide Web site is only accessible via an intranet.

6. The method of claim 5, wherein said network element comprises a network element located on an optical network.

7. A system for providing read-only access to network element configuration data, comprising:

a mass storage device communicatively coupled to a network server comprising a SONETCAP application comprising instructions for communicating with the network element and a TL1 script database comprising a customizable script corresponding to a network element to account for peculiarities in implementation of a TL1 Protocol;

a network element located on an optical network operative to store configuration data describing the current configuration state of the network element and further operative to provide said configuration data in response to requests for said data received through a SONET transport center, the network element comprising SONET hubs that are linked by fiber optic connections to form a closed loop; and a server computer communicatively coupled to said network element and operative to provide a World Wide Web site at which a request may be received to view said configuration data, to retrieve said configuration data from said network element in response to said request, to provide said configuration data in a read-only format in response to said request, the request comprising a target identification code corresponding to the network element, to retrieve previously stored configuration data associated with the network element from a database, to compare the previously stored configuration data to the configuration data received from the network element, to determine whether the previously stored configuration data and the configuration data received from the network element are identical, and to store the configuration data received from the network element in the database in response to determining that the previously stored configuration data and the configuration data received from the network element are not identical.

8. The system of claim 7, wherein said server computer is further operative to receive a user login and password, to determine if said user login and password are authorized to access said configuration data, and to provide an error message in response to said request if said user login and password are not authorized to access said configuration data.

9. The system of claim 8, further comprising a telemetry assignment system database having previously stored configuration data for said network element; and wherein said server computer is further operative to retrieve said previously stored configuration data, to compare said previously stored configuration data to said configuration data received from said network element, to determine whether said previously stored configuration data and said configuration data received from said network element are identical, and, in response to determining that said previously stored configuration data and said configuration data received from said network element are not identical, to store said configuration data received from said network element in said telemetry assignment system database.

10. The system of claim 9, wherein said World Wide Web site is accessible only via an intranet.

11. A computer-readable medium comprising computer executable instructions which, when executed by a computer, cause the computer to:
   initiate a communications session through a SONET transport center with a network element in response to a request to access configuration data for said network element, the request comprising a target identification code corresponding to the network element, the network element comprising SONET hubs that are linked by fiber optic connections to form a closed loop;
   receive said configuration data from said network element;
   transmit said configuration data in a read-only format as a response to said request;
   maintain a mass storage device, the mass storage device comprising a SONETCAP application comprising instructions for communicating with the network element, a TL1 script database comprising a customizable script corresponding to the network element to account for peculiarities in implementation of a TL1 protocol, wherein receiving the configuration data comprises using the SONETCAP application to communicate with the network element and using the TL1 script database to implement the TL1 protocol to communicate with the network element;
   retrieve previously stored configuration data associated with the network element from a database;
   compare the previously stored configuration data to the configuration data received from the network element;
   determine whether the previously stored configuration data and the configuration data received from the network element are identical; and
   store the configuration data received from the network element in the database in response to determining that the previously stored configuration data and the configuration data received from the network element are not identical.

12. The computer-readable medium of claim 11, wherein said request further comprises a user login and password, and wherein said computer executable instructions are further operative to cause the computer to generate an error message in response to said request if said user login and password are not authorized to access said configuration data.

13. A computer-readable medium comprising computer executable instructions which, when executed by a computer, cause the computer to:
   initiate a communications session with a network element through a SONET transport center in response to a request to access configuration data for said network element, the request comprising a target identification code corresponding to the network element wherein said request further comprises a user login and password, and wherein said computer executable instructions are further operative to cause the computer to generate an error message in response to said request if said user login and password are not authorized to access said configuration data, the network element comprising SONET hubs that are linked by fiber optic connections to form a closed loop;
   receive said configuration data from said network element;
   transmit said configuration data in a read-only format as a response to said request;
   maintain a mass storage device, the mass storage device comprising a SONETCAP application comprising instructions for communicating with the network element, a TL1 script database comprising a customizable script corresponding to the network element to account for peculiarities in implementation of a TL1 protocol, wherein receiving the configuration data comprises using the SONETCAP application to communicate with the network element and using the TL1 script database to implement the TL1 protocol to communicate with the network element;
   retrieve previously stored configuration data associated with said network element from a database;
   compare said previously stored configuration data to said configuration data received from said network element;
   determine whether said previously stored configuration data and said configuration data received from said network element are identical; and
   to store said configuration data received from said network element in said database in response to determining that said previously stored configuration data and said configuration data received from said network element are not identical.

14. The method of claim 1, wherein the network element comprises a network element located on an optical network having one or more SONET rings.

15. The system of claim 7, wherein the network element comprises a network element located on an optical network having one or more SONET rings.

16. The computer-readable medium of claim 11, wherein said network element comprises a network element located on an optical network having one or more SONET rings.

17. The method of claim 1, wherein the configuration data includes at least one of information regarding the installation of the network element and information regarding the existence of the network element.

18. The system of claim 7, wherein the configuration data includes at least one of information regarding the installation of the network element and information regarding the existence of the network element.

19. The computer-readable medium of claim 11, wherein the configuration data includes at least one of information regarding the installation of the network element and information regarding the existence of the network element.

20. The system of claim 7, wherein the network element comprises a network element located on an optical network and the configuration data includes at least one of information regarding the installation of the network element and information regarding the existence of the network element.

* * * * *